United States Patent Office 2,986,549
Patented May 30, 1961

2,986,549

ORGANOPOLYSILOXANE RESINS

Joseph R. McLoughlin, Ballston Lake, N.Y., assignor to General Electric Company, a corporation of New York No Drawing. Filed Aug. 20, 1959, Ser. No. 834,957

5 Claims. (Cl. 260—45.85)

This application is a continuation-in-part of my application Serial No. 573,627, filed March 26, 1956, now abandoned, and assigned to the same assignee as the present invention.

This invention is concerned with improving the shelf life or storage stability of organopolysiloxane resins containing alkaline condensing or curing agents, and methods for preparing such stable composition, which comprises incorporating in such resins small amounts of an organic acid readily removable from the resin at the time of cure, the said organic acid being incorporated in an amount sufficient to stabilize the resin, but insufficient to affect adversely the curing rate of the resin in subsequent applications.

It has been known in the past that organopolysiloxane resins can be cured by heat much more rapidly to the substantially infusible and insoluble state and give improved properties in the cured state if one employs as the condensation catalyst (or curing agent) an alkaline condensation catalyst. However, although the amount of alkaline condensation catalyst present in the curable organopolysiloxane is very small (e.g., 0.001 to 1 percent, by weight, based on the weight of the organopolysiloxane), serious problems of storage are inherent in such mixtures, particularly those containing the strong bases such as quaternary bases, and especially in connection with resin solutions of high solids content. Because of these factors, such mixtures are quite unstable in storage and generally become cloudy and advance in the state of cure within a period of only a few days, and sometimes after only a few hours. This, of course, interposes a difficult and serious handling problem. Because of the low rate of stability, resins of this sort have to be used promptly after they are catalyzed with the alkaline condensation catalyst or else must be refrigerated in order to reduce the activity of the resin. However, such procedures are usually not practical and, in general, limit the uses of such highly desirable fast curing, low-temperature-curable resins.

The term "alkaline condensation catalyst" or "alkaline curing agent" as employed in the specification and appended claims is intended to mean and include curing agents for organopolysiloxane resins of an alkaline nature as distinguished from the many non-alkaline drier type curing agents of lower activity which are described in Welsh Patent 2,449,572. These alkaline condensation catalysts consist of quaternary ammonium and phosphonium compounds. The quaternary ammonium compounds have the formula $(R')_4NOR''$ where $R'$ represents members selected from the class consisting of alkyl radicals, e.g., methyl, ethyl, propyl, n-butyl, hexyl, octyl, etc. radicals; cycloalkyl radicals, e.g., cyclohexyl, cycloheptyl, etc. radicals; aryl radicals, e.g., phenyl, diphenyl, etc. radicals, alkaryl radicals, e.g., tolyl, xylyl, etc. radicals; aralkyl radicals, e.g., benzyl, phenylethyl, etc. radicals, and mixtures of the aforesaid radicals, and $R''$ is a member selected from the class consisting of hydrogen and alkyl radicals, e.g., methyl, ethyl, propyl, butyl, etc., radicals, as, for instance, quaternary ammonium hydroxide, tetrabutyl ammonium hydroxide, quaternary ammonium alkoxides (e.g., quaternary ammonium butoxide, quaternary ammonium ethoxide, etc.), etc. Quaternary phosphonium compounds have the formula $(R')_4POR''$ where $R'$ and $R''$ have the meanings given above, for instance, tetramethyl phosphonium hydroxide, tetraethyl phosphonium hydroxide, tetra-n-butyl phosphonium hydroxide, tetraoctyl phosphonium hydroxide, dimethyl diethyl phosphonium hydroxide, phenyltrimethyl phosphonium hydroxide, butyl tricyclohexyl phosphonium hydroxide, tetramethyl phosphonium methoxide, tetrabutyl phosphonium butoxide, etc.

Unexpectedly, I have discovered that these active organopolysiloxane resins containing the alkaline catalysts can be readily stabilized to yield resinous solutions which are stable at temperatures of from 25° to 50° C. for long periods of time (e.g., from 4 to 6 months or more) without impairing the properties of films obtained by curing solutions of the resin at elevated temperatures. The aforesaid difficulties can be obviated and improved stability built into the unstable organopolysiloxane resins containing such alkaline catalysts by incorporating therein small amounts of acetic acid which is readily removable from the resin during the heat-curing step. Acetic acid can be readily volatilized (at curing temperatures of the resin) at the same time that the resin solvent is being removed during the curing step. The amount of acetic acid used, on a weight basis, is preferably within the range of from about 0.001 to about 1 percent of the acid based on the solids content of the resin in the resinous solution and the acid is used in an amount equal to from 2 to 50 mols per mol of alkaline curing agent in the resin.

The organopolysiloxane resins with which the present invention is concerned are those which are obtained by effecting hydrolysis of two or more hydrolyzable organosilanes of the general formula $R_nSiX_{4-n}$ where $R$ is a radical selected from the class consisting of monovalent hydrocarbons and halogenated (e.g., chlorinated) hydrocarbon radicals, X is a hydrolyzable group, e.g., chlorine, bromine, ethoxy, propoxy, acyloxy, aryloxy, etc., and $n$ is a whole number equal to from 1 to 3, it being understood that there is a sufficient amount of the compound $RSiX_3$ present in the mixture of hydrolyzable organosilanes to give an organic-to-silicon ratio of between 1.1 to 1.85. Among the radicals which R may represent are, for instance, alkyl (e.g., methyl, ethyl, propyl, butyl, isobutyl, etc.); aryl (e.g., phenyl, naphthyl, anthracyl, etc.); alkaryl radicals (e.g., tolyl, xylyl, ethylphenyl, etc.); aralkyl radicals (e.g., benzyl, phenylethyl, etc.); halogenated aryl (e.g., chlorophenyl, tetrachlorophenyl, etc.). The presence of other silicon-bonded radicals, for instance, hydroxyl, vinyl, allyl, etc., radicals is not precluded. Such resins may also contain in the hydrolyzed state two or more different radicals attached to silicon as is the case with the methyl phenylpolysiloxanes which can be obtained, for example, by cohydrolysis of dimethyldichlorosilane, methyltrichlorosilane, and methyl phenyldichlorosilane. Preferably the organopolysiloxane resins employed in the practice of the present invention are methylphenylpolysiloxanes.

Examples of mixtures of organochlorosilanes (or organoalkoxysilanes which may be substituted for the organochlorosilanes) which may be employed in the preparation of organopolysiloxanes with which the present invention is concerned are, for instance, mixtures of methyltrichlorosilane and dimethyldichlorosilane; mixtures of methyltrichlorosilane, dimethyldichlorosilane and phenyltrichlorosilane; mixtures of dimethyldichlorosilane, methyltrichlorosilane and diphenyldichlorosilane; mixtures of methyltrichlorosilane, phenyltrichlorosilane, dimethyldichlorosilane and diphenyldichlorosilane; mixtures of methyltrichlorosilane, ethyltrichlorosilane, and dimethyldichlorosilane, etc. In choosing the mixtures of the hydrolyzable organosilanes, attention should be given to the use of such hydrolyzable organosilanes which in the final hydrolyzed product will yield an organopolysiloxane having an average of between 1.1 to 1.85 total organic groups per silicon atom bonded to the silicon atoms by carbon-silicon linkages. Examples of organopolysiloxanes having the above-mentioned silicon-bonded hydrocarbon and halogenated hydrocarbon radicals attached thereto within the organic-to-silicon ratio above are found, for instance, in U.S. Patent 2,449,572, issued September 21, 1948, U.S. Patents 2,258,218–222, issued October 7, 1941, and U.S. Patent 2,383,827, issued August 28, 1945. These patents, as well as other references in the literature, give preferable molar concentrations of the hydrolyzable organosilanes (which prior to hydrolysis may have intermixed therewith small amounts of silicon tetrachloride or alkyl orthosilicates) which are advantageously employed in making the resins stabilized in accordance with the present invention.

As pointed out above, the amount of the acetic acid stabilizer added is preferably within the range of from about 0.001 to 1 percent, by weight, based on the weight of the organopolysiloxane solids, although concentrations outside these ranges may be used under some conditions so long as the mole ratio of acetic acid to alkaline curing agent is within the range recited above. In general, the invention herein described is best suitable in connection with organopolysiloxane resins which have a basicity content of between 0.001 to 1 percent of alkaline condensation catalyst, based on the weight of the organopolysiloxane resin solids. Within this range, usually optimum rates of cure are attained although it will be apparent to those skilled in the art that ranges of basicity outside the above preferred range may be employed without departing from the scope of the invention.

It was unexpected to find that acetic acid stabilized the alkaline curing agent catalyzed resins since all acids do not act in the same way. Thus, it was found that although mineral acids such as hydrochloric acid or sulfuric acid can be used to prolong the storage stability, such inorganic acids interfere undesirably with the cure of the resin, even if the cure is conducted at higher than usual temperatures so that the incorporation of these mineral acids interferes with one of the main objectives of the present invention, namely, to improve storage stability without unduly affecting the curing ability of the resin in subsequent applications. In addition to the unexpected inability of mineral acids to effect the desired objectives, it has also been found that other materials which upon hydrolysis, for instance, upon contact with the air, give off hydrogen chloride such as organochlorosilanes, for intsance, phenyltrichlorosilane, when added for stabilization purposes to the organopolysiloxane containing the alkaline catalyst, also fails to act in the same manner as acetic acid and interfere with the rapid cure of the resin.

In order that those skilled in the art may better understand how the present invention may be practiced, the following examples are given by way of illustration and not by way of limitation. All parts are by weight.

The organopolysiloxane resin employed in the tests described in the following examples was prepared by cohydrolyzing equimolar concentrations of phenyltrichlorosilane and dimethyldichlorosilane in a hydrolysis medium composed of toluene and water. The resin solution thus obtained (after separation from the water) was filtered and stripped of solvent until a methyl phenylpolysiloxane resin solids content of about 50 percent was obtained. The viscosity was about 25 centipoises when measured at 25° C. Unless otherwise stated, tetramethyl ammonium hydroxide (as a condensation catalyst for the resin) was added in an amount equal to about 0.015 part of the latter per 100 parts of the resin solids in the resinous solution. This resin solution was identified as resin A. The amount of acetic acid stabilizers added was based in each instance on the weight of resin solids.

EXAMPLE 1

To resin A described above were added varying amounts of acetic acid. The percentage acetic acid added was based on the weight of the resin solids in the resinous solution. The following Table I shows the mols acetic acid per mol of catalyst and shows the results of the aging tests conducted on the stabilized resins. This test consisted in maintaining the resin solution with or without the acetic acid at temperatures of about 25° C. and at 50° C. for varying lengths of time. The shelf life or degree of stabilization was arbitrarily taken as the length of time in which the tested resin became so viscous that it exhibited no visible flow when inverted in a sealed tube.

*Table I*

| Percent Acetic Acid | Mols Acetic Acid per Mol Catalyst | Shelf Life at 25° C. | Shelf Life at 50° C. |
| --- | --- | --- | --- |
| 0 (Control) | 0 | 10 days (gelled) | 4 days (gelled). |
| 0.02 | 2 | Essentially same viscosity after 167 days. | Essentially same viscosity after 167 days. |

The curing rate of the stabilized resin was materially unaffected by the addition of the acetic acid. Thus, the cure of the stabilized resin at 200° C. (said cure being determined by ascertaining the time required for a drop of the resin to harden or gel on a 200° C. hot plate) was of the order of about 15 seconds without the acetic acid, while the resin with the acetic acid showed a cure of about 17 to 20 seconds.

EXAMPLE 2

In this example, varying concentrations of acetic acid were added to the resin solution identified as resin A above. The stability of the resin solution was tested similarly as in Example 1, in some instances at 50° C. and in other instances at 100° C. The following Table II shows the results of the stability or shelf life tests.

*Table II*

| Percent Acetic Acid | Mols Acetic Acid per Mol Catalyst | Test Temperature, °C. | Stability |
| --- | --- | --- | --- |
| 0 | 0 | 25 | Gelled in less than 7 days. |
| 0 | 0 | 50 | Gelled in less than 3 days. |
| 0 | 0 | 100 | Gelled in 10 to 20 min. |
| 0.02 | 2 | 50 | Not gelled after 36 days. |
| 0.10 | 10 | 50 | Do. |
| 0.50 | 50 | 50 | Do. |
| 0.20 [1] | 20 | 100 | Not gelled until after 23 days. |

[1] The methyl phenylpolysiloxane resin used in these tests was the same as that previously used with the exception that the resin solution was a 68% solids solution and the viscosity was 100 centipoises at 25° C.

All of the foregoing resin mixtures containing the varying amounts of the acetic acid could be readily cured at essentially the same rate as when the acid was omitted from the resin.

EXAMPLE 3

This example presents data from other runs using acetic acid as a stabilizer for organopolysiloxanes containing alkaline condensation catalysts. The organopolysiloxane employed was the same methyl phenylpolysiloxane used in Examples 1 and 2, namely, resin A. The conditions for testing were identical with those again described in the above-mentioned examples employing the inverted, closed tube for determining the gelation point of the resin as indicated by the failure of the resin solution in the closed tube to flow when the tube was inverted. This test was conducted at 50° C. The alkaline condensation catalyst used was tetramethyl ammonium hydroxide employed in an amount equal to about 0.015 part per 100 parts resin solids in the resin solution. The following Table III shows the results of these tests.

*Table III*

| Percent Acetic Acid | Mols Acetic Acid per Mol Catalyst | Stability |
| --- | --- | --- |
| 0 | 0 | Gelled in less than 3 days. |
| 0.05 | 5 | Did not gel until after 20 months. |
| 0.1 | 10 | Did not gel until after 18 months. |
| 0.3 | 30 | Did not gel until after 6 months. |

All the resins cured at a satisfactory rate at 200° C.

EXAMPLE 4

In this example, acetic acid was used as a stabilizer for a methyl phenylpolysiloxane resin catalyzed with tetrabutyl phosphonium hydroxide having the formula $$(C_4H_9)_4P\text{—}OH$$

which was added in an amount equal to 0.012 percent by weight, based on the weight of the methyl phenylpolysiloxane resin solids. Varying amounts of acetic acid were added to this catalyzed methyl phenylpolysiloxane resin solution and the time for the resin solution to gel at 50° C. was determined. Table IV shows the results of these tests.

TABLE IV

| Percent Acetic Acid | Mols Acetic Acid per Mol Catalyst | Stability |
| --- | --- | --- |
| 0.01 | 3.8 | Gelled after 50 days. |
| 0.02 | 7.6 | Gelled after 110 days. |
| 0.05 | 19 | Did not gel even after 120 days. |
| 0.1 | 38 | Do. |

All the stabilized resins of Example 4 could be readily cured at from 125° to 200° C. at essentially the same rate as the unstabilized resin without any apparent changes in properties of the cured resin.

It will, of course, be apparent to those skilled in the art that other organopolysiloxane resins and various other alkaline condensing agents, many examples of which have been given above, may be employed and stabilized in place of the ones used in the preceding examples.

The stabilized organopolysiloxane resin solutions (which may be in more dilute concentrations and as low as 1 to 2 percent, by weight solids) can be employed in various applications. Thus, these resins (in solvents such as toluene, xylene, benzene, trichloroethylene, etc.) may be used to coat electrically conducting metallic cores (e.g., copper, aluminum, alloys of copper, etc.) which can then be heat-treated at temperatures ranging from about 150° to 200° C. to obtain heat-resistant flexible insulated wires. Various types of electrical equipment, including coils, can be dipped in these resinous solutions and can be again heat-treated to give moisture-resistant surfaces exhibiting good electrical properties. In addition, these resinous solutions can be further diluted and employed for treating various masonries to render the same water-repellent as is more particularly disclosed in Brick Patent 2,574,168.

In many of the above applications, as well as in the other applications for which organopolysiloxane resins are currently employed, one of the main problems is to maintain the stability of the resin so that in cases of transit over long distances or when stored for long periods of time, especially in environments where temperatures may rise above normal temperatures, the resin solution remains substantially unchanged over long periods of time under such conditions in order that undesirable changes in the properties of the cured resin may not be encountered due to the unexpected advancement in the state of cure of the resin prior to use.

Because of the desirability of using alkaline condensation catalysts with their attendant rapid cures of organopolysiloxane resins, it is possible for the manufacturer of the resin to incorporate these alkaline condensing agents in the resin prior to shipment to the end user who may not have the necessary equipment to do his own blending of the resin solution with the alkaline condensation catalyst. Unless organopolysiloxane resin solutions containing these alkaline condensation catalysts can be adequately stabilized, this important advantage cannot be attained. The present invention permits use of these desirable condensation catalysts with organopolysiloxane and yet allows a large time leeway between incorporation of the alkaline condensation catalyst and use of the resin containing the said catalyst.

What I claim as new and desire to secure by Letters Patent of the United States is:

1. A resinous composition of matter of improved stability against increase in viscosity at temperatures of from 25° to 50° C. comprising (1) a methyl phenylpolysiloxane resin solution, there being present an average of from 1.1 to 1.85 total methyl and phenyl groups per silicon atom in the methyl phenylpolysiloxane, (2) tetramethyl ammonium hydroxide as a curing catalyst, and (3) acetic acid, the said acetic acid being present in an amount equal to from 2 to 50 mols per mol of the tetramethyl ammonium hydroxide.

2. A resinous composition of matter of improved stability against increase in viscosity at temperatures of from 25° to 50° C. comprising (1) a methyl phenylpolysiloxane resin solution containing an average of from 1.1 to 1.85 total methyl and phenyl groups per silicon atom in the methyl phenylpolysiloxane, (2) a quaternary compound curing catalyst selected from the class consisting of quaternary compounds having the formula $(R')_4NOR''$ and quaternary phosphonium compounds having the formula $(R')_4POR''$ where $R'$ represents members selected from the class consisting of alkyl, cycloalkyl, aryl, alkaryl, and aralkyl radicals and $R''$ is a member selected from the class consisting of hydrogen and alkyl radicals, and (3) acetic acid, the said acetic acid being present in an amount equal to from 2 to 50 mols per mol of the quaternary compound curing catalyst.

3. The process which comprises adding acetic acid to a methyl phenylpolysiloxane resin solution containing a quaternary compound curing catalyst selected from the class consisting of quaternary ammonium compounds having the formula $(R')_4NOR''$ and quaternary phosphonium compounds having the formula $(R')_4POR''$ where $R'$ represents a member selected from the class consisting of alkyl, cycloalkyl, aryl, alkaryl and aralkyl radicals and $R''$ represents a member selected from the class consisting of hydrogen and alkyl radicals, said acetic acid being added in an amount equal to from 2 to 50 mols per mol of the quaternary compound curing catalyst, and thereafter heating the resulting solution at a temperature above the boiling point of said acetic acid whereby the acetic acid is volatilized from the solution and the resin is cured.

4. The process of claim 3 in which the quaternary compound curing catalyst is tetramethyl ammonium hydroxide.

5. The process of claim 3 in which the quaternary compound curing catalyst is tetrabutyl phosphonium hydroxide.

References Cited in the file of this patent

UNITED STATES PATENTS

| 2,571,533 | Britton et al. | Oct. 16, 1951 |
| 2,610,169 | Hyde et al. | Sept. 9, 1952 |
| 2,755,261 | Clark | July 17, 1956 |
| 2,906,734 | Clark | Sept. 29, 1959 |

FOREIGN PATENTS

| 1,169,966 | France | Sept. 15, 1958 |